Figure 1:
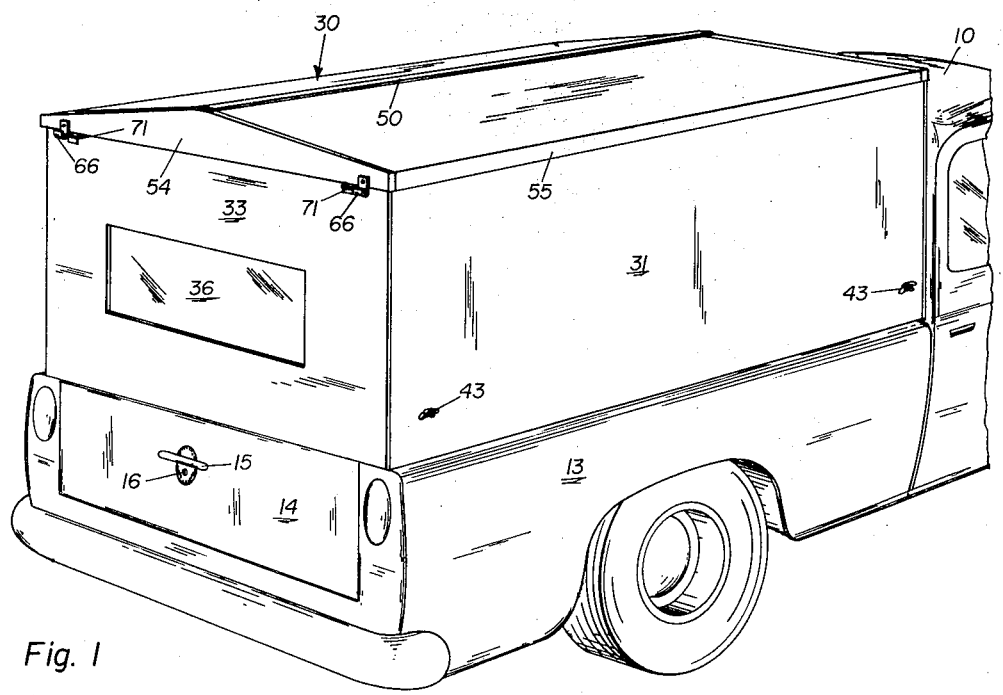

Sept. 22, 1964     E. M. HEERMANN     3,149,878
REMOVABLE SUPERSTRUCTURE FOR ASSOCIATION WITH A PICK-UP TRUCK
Filed Jan. 8, 1962     3 Sheets-Sheet 1

*INVENTOR.*
Elmer M. Heermann
BY
Buckhorn, Cheatham & Blore
ATTORNEYS

Sept. 22, 1964         E. M. HEERMANN         3,149,878
REMOVABLE SUPERSTRUCTURE FOR ASSOCIATION WITH A PICK-UP TRUCK
Filed Jan. 8, 1962         3 Sheets-Sheet 2

*INVENTOR.*
Elmer M. Heermann
BY
Buckhorn, Cheatham & Blore
ATTORNEYS

Sept. 22, 1964     E. M. HEERMANN     3,149,878
REMOVABLE SUPERSTRUCTURE FOR ASSOCIATION WITH A PICK-UP TRUCK
Filed Jan. 8, 1962     3 Sheets-Sheet 3

INVENTOR.
Elmer M. Heermann
BY
Buckhorn, Cheatham & Blore
ATTORNEYS

United States Patent Office 3,149,878
Patented Sept. 22, 1964

3,149,878
REMOVABLE SUPERSTRUCTURE FOR ASSOCIATION WITH A PICK-UP TRUCK
Elmer Martin Heermann, 9307 NW. 9th Ave., Vancouver, Wash.
Filed Jan. 8, 1962, Ser. No. 164,680
1 Claim. (Cl. 296—102)

The present invention comprises a superstructure for removable association with the box or bed of a pick-up truck or similar vehicle. A principal purpose of the present invention is to provide means to protect the contents of a pick-up truck against inclement weather, which means may be quickly and easily applied to the truck or removed when not desired. Another purpose of the present invention is to provide a removable "camper" structure which may be associated with a pick-up truck or similar vehicle.

A principal object of the present invention is to provide means of the above character which is formed of readily available, easily assembled parts. A problem connected with superstructures of this character is that they are usually fabricated into a completed housing which is hard to handle and difficult to store. Usually, camper structures are sold with four tall jacks which may be placed at the sides of the vehicle, attached to the superstructure whereby to elevate the same, and then the truck is driven away from beneath the superstructure. This requires sufficient yard space for the purpose and means that a somewhat unsightly structure remains in the yard during long periods of non-use. The present invention obviates this disadvantage by providing a superstructure including a frame, the elements of which may be quickly separated and stowed in a small storage space, removable walls which may be quickly disassembled from the frame and stowed in a relatively small space, and a removable roof of similar character. A further advantage of the present invention therefore is that the superstructure wall and roof members may comprise inexpensive plywood or fiberboard since they are protected against the weather when not in use.

A further purpose of the present invention is to provide a superstructure frame including a plurality of stakes, the lower portion of each of which is easily expanded into firm frictional engagement with stake wells provided for that purpose on pick-up truck bodies or truck beds. A problem connected with prior structures has been that the stakes merely slip into the stake wells, with the result that the superstructure bounces about and may become torn apart during trips. With the present invention the superstructure is readily and easily associated with the truck body as firmly as though it were a part of the body.

A further purpose of the present invention is to provide means of the foregoing character in which the side walls of the superstructure may be easily and quickly slid into the roof portion of the superstructure so that the body may be loaded from the side.

A further object of the present invention is to provide means of the foregoing character including a rear door which may be locked in closed position by the action of locking the tail gate of the body.

A further object of the present invention is to provide means of the foregoing character in which the side walls and rear door may be swung open and propped in position to provide additional rain cover or shade, or to provide ventilation when the superstructure is being used as a camper in hot weather.

The foregoing and other objects and advantages of the present invention will be more readily apparent from inspection of the accompanying drawings taken in connection with the following specifications, in which like numerals refer to like parts throughout.

Figure 2:
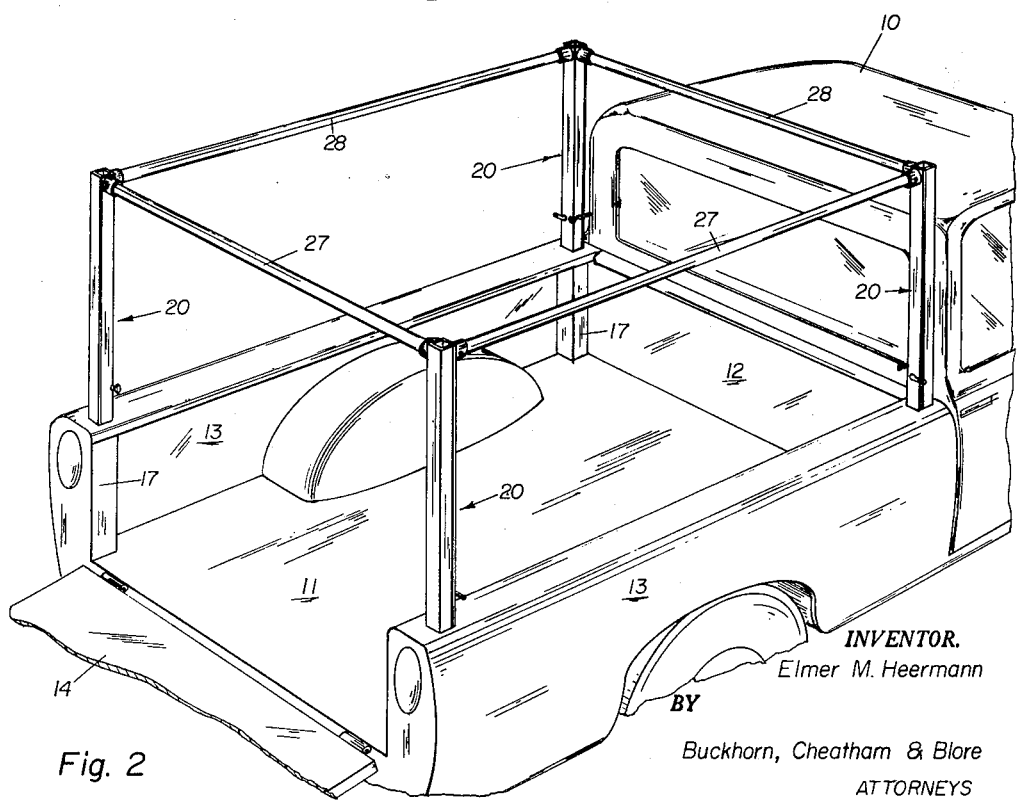
Figure 3:
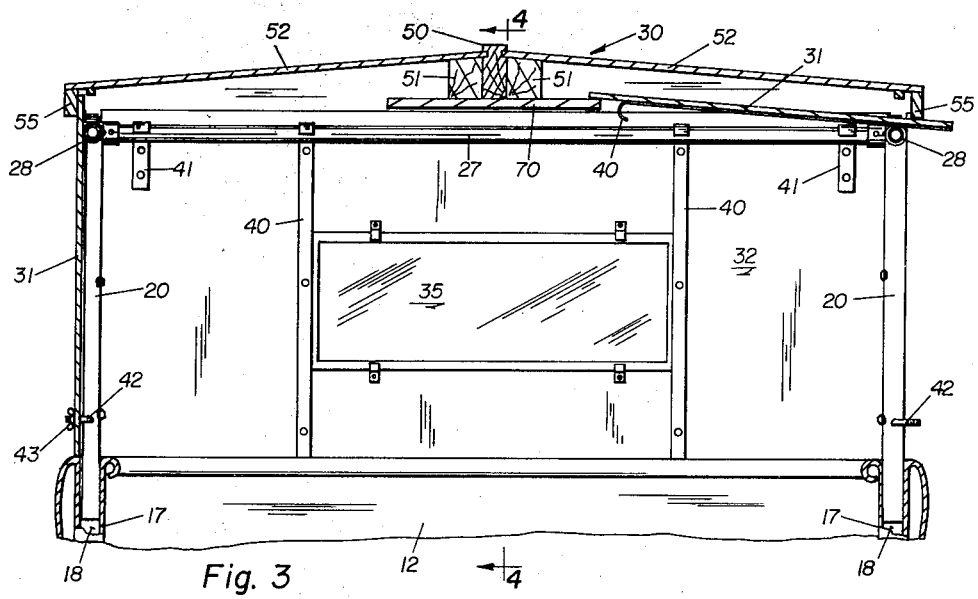
Figure 4:
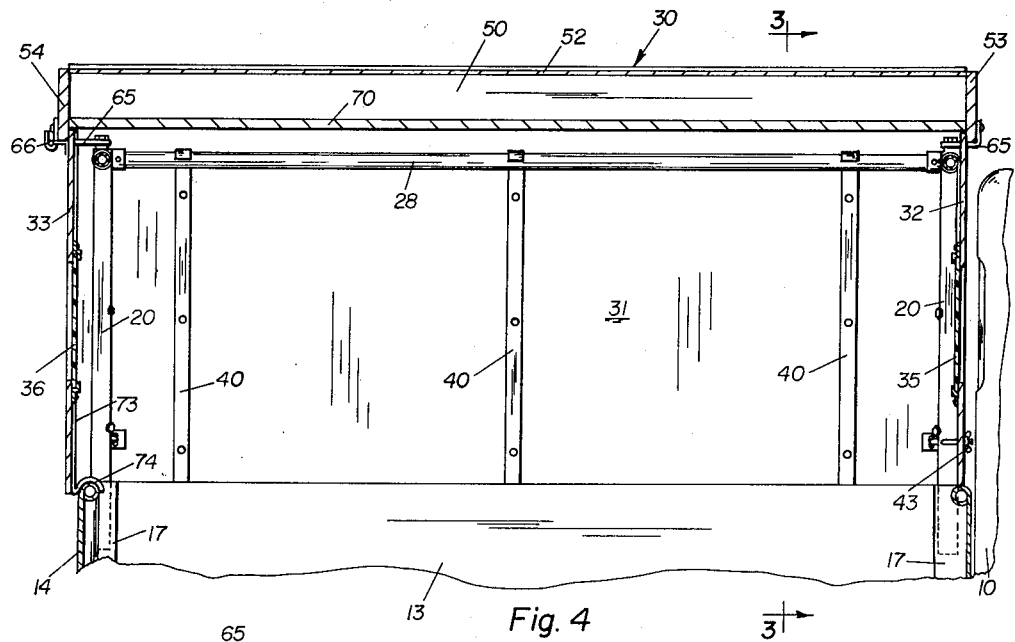
Figure 5:
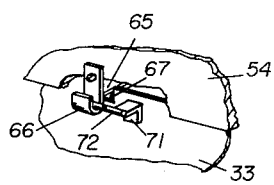
Figure 6:
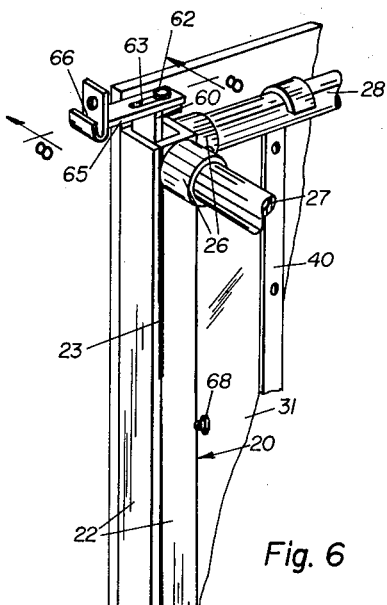
Figure 7:
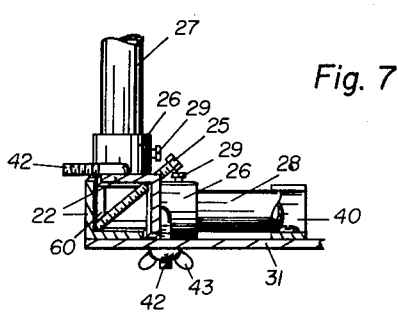
Figure 8:
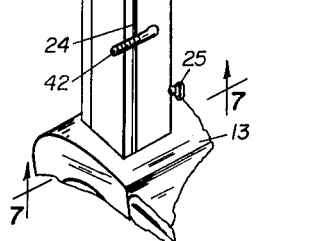
Figure 8:
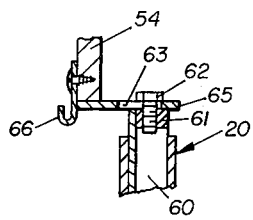
Figure 9:
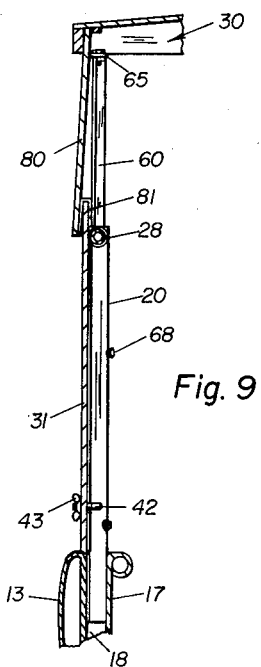

In the drawings,
FIG. 1 is a view, in perspective, of a pick-up truck body having the superstructure of the present invention mounted thereon and in traveling condition;
FIG. 2 is a similar view showing the frame of the superstructure alone;
FIG. 3 is a transverse, vertical section taken substantially along lines 3—3 of FIG. 3;
FIG. 4 is a longitudinal vertical section taken substantially along lines 4—4 of FIG. 3;
FIG. 5 is a view, in perspective, of a detail of the door mounting means;
FIG. 6 is a view, in perspective, of one of the stakes in position, and parts of adjoining apparatus;
FIG. 7 is a horizontal section taken substantially along lines 7—7 of FIG. 6;
FIG. 8 is a partial vertical section taken substantially along lines 8—8 of FIG. 6; and
FIG. 9 is a detail view showing a means of extending the height of the superstructure.

The pick-up truck herein illustrated is meant to be illustrative of various types of vehicles at present on the market, the truck usually comprising a cab 10 and a bed 11. The bed is usually surrounded by a front wall 12, side walls 13 and a tail gate 14. The tail gate is usually provided with an operating handle 15 with which is associated a lock 16. Means 17 are usually provided at the corners of the bed to form upwardly open stake wells 18. A superstructure frame including a plurality of stakes 20 and a plurality of horizontal bar members is adapted to be removably mounted on the truck by inserting the lower parts of the stakes into the stake wells 18 and expanding the lower parts of the stakes into firm frictional engagement with the walls of the stake well forming means 17.

Each of the stakes comprises a tubular member, the major, lower portion of which is provided with an opposed pair of longitudinal slits longitudinally dividing the stakes into two portions which may be sprung apart. The stakes are formed of metal capable of being so sprung, and of naturally springing back into aligned relationship with each other so that they may be easily inserted and withdrawn when the stake is not expanded. The preferred form of the stake is fully illustrated in FIGS. 6 and 7, the stake comprising a pair of angle bars 22 arranged to form a tubular member of rectangular cross section, the adjacent edges thereof, for about one-third of their length, being welded together as indicated at 23, the absence of welding in the lower parts of the stakes providing the slits 24 which bifurcate the stakes. In the lower part of each stake there is threadedly mounted a bolt 25 which is threaded into the angle of the inner angle bar, horizontally traverses the interior of the stake and bears against the angle of the outer angle bar. When the bolt is screwed inwardly the lower parts of the angle bars are thereby sprung apart from each other to firmly engage the stakes in the stake wells.

A pair of horizontally extending socket members 26 are welded to the upper end of the inner angle bar for reception of the respective ends of horizontally disposed bar members 27 and 28 mounted between adjacent pairs of stakes. The bar members 27 and 28 are conveniently formed of iron pipe. Thus the purchaser of the required number of stakes may cut readily available pipe lengths to effect the individual construction. Each socket member 26 is provided with a set screw 29 or the like to lock the bar members in position. It may be seen from the foregoing that the operation of four bolts 25, and eight set screws 29, is all that is required to assemble a rigid frame on the truck bed, or to remove the frame and separate it for convenient storage.

A housing superstructure is readily provided by easily assembled and readily removable wall and roof panel structures. Each of the walls may be provided by a manufacturer in definite sizes for specific trucks, or may be provided in partially completed over-size forms which may be easily cut and completed by the purchaser to suit the individual installation. Or the manufacturer may supply the necessary hardware only, complete with directions for assembling them with readily available panel materials.

The housing structure comprises a roof assembly 30, a pair of side panels 31, a front panel 32, and a rear door panel 33. The front panel 32 preferably includes a window opening located to be in alignment with the rear window of the truck cab, and with which is associated a transparent plastic window pane 35. The rear door panel is preferably provided with a similar window opening with which is associated a transparent plastic window pane 36, in order that the driver may have a rear vision through the superstructure. Similar windows may be provided in the side panels if desired.

Each of the side panels 31 and the front panel 32 is hung from the respective horizontal bar members 27 and 28 by vertically extending straps 40 which are screwed to the interior surface of the panel and reinforce the same against bending, whereby light plywood or thin fiberboard may be utilized for the panel. Each of the straps is provided with an inwardly extending hook at its upper end adapted partially to embrace the bar member in order to pivotally hang the panel in position. If desired other shorter, hooked strap members 41 may supplement the long straps 40. The panels extend slightly above the hook ends of the straps. Horizontally projecting studs 42 are welded to the surfaces of the stakes adjacent their lower portions, and the panels are correspondingly drilled to provide openings for the studs whereby the panels may be held in position by wing nuts 43. It may be seen from the foregoing that the front wall and the side walls are easily placed or removed by operating six wing nuts alone.

The next step in assembling the superstructure is to mount the roof 30. The roof 30 preferably comprises a 2 x 4 ridge member 50 extending longitudinally of the roof, which is braced by parallel wooden members 51. The roof tree thus formed is shaped for weather-proof reception of the upper edges of a pair of panels 52 forming a gently sloped gable roof. The roof is completed by a front end board 53, a rear end board 54 and lateral, depending flanges 55. The front end board 53 overlaps the upper edge of the front wall 32, and the side flanges 55 overlap the upper edges of the side walls 31, in contact therewith so as to seal the structure against dust.

In order to support the roof 30 in proper relation to the rest of the structure, means are provided as follows: An angle bar 60 is slid longitudinally into each of the stakes 20, the lower end of the bar normally resting upon the transverse bolt 25. A nut 61 is welded to the top of the angle bar 60 for reception of a bolt 62 which passes through a slot 63 in a longitudinally extending strap 65. The forward pairs of straps 65 are formed as angle brackets upon which the end board 53 rests and which are screwed to the outer surface of the end board. The rear pair of straps 65 are welded to U-shaped members 66, the inner, longer legs of which are screwed to the outer surface of the end board 54. The front and rear panels are notched for passage of the horizontal straps 65 as indicated at 67 in FIG. 5. The angle bar 60 may be welded or otherwise fastened to the stakes 20 by suitable means (not shown) after parts have been fitted together. Preferably the angle bar 60 is held in adjusted position by a bolt 68 passing through the inner portion of the stake 20 and forcing the angle bar 60 against the outer portion of the stake.

As illustrated in FIG. 3 either side panel may be shifted into a position such that it will be held against closing while being immediately available for closing the side of the superstructure, as follows. A wide board 70 runs longitudinally of the interior, fastened to the lower surface of the ridge members 50 and 51 and projecting laterally therefrom to provide a shelf at each side immediately beneath the respective roof panel 52. The wing nuts 43 holding the side panel in position may be removed and the side panel slid upwardly and inwardly until its upper edge rests on the board 70. Also, the side panels may be swung upwardly and propped in open position to provide lateral eaves for additional protection against the weather, and ventilation, when the truck is stationary.

The rear door panel 33 is also pivotally mounted, preferably by means as follows: A pair of angle brackets 71 are fastened to the outer surface near the upper edge of the panel, each bracket being provided with a laterally projecting pin 72 which may be received in the hook member 66. Vertical straps 73 screwed to the inner surface of the panel 33 are provided with hooked lower end portions 74 adapted to embrace the upper edge of the tail gate. When the tail gate is swung nearly closed, the hook end 74 may be engaged with the upper edge of the tail gate so that the rear door panel is jammed between the tail gate and the rear end of the longitudinally extending board 70, thereby locking the rear door in closed position. The rear door may be swung open and suitably propped as an eave at the rear of the truck. The rear door may also be swung through substantially 180° to the rear so that the hinge pins 72 may be lifted from the hooks 66, thereby permitting entire removal of the rear door. Studs 42 and wing nuts 43 may be mounted upon the rear stakes, if desired, for holding the rear door in position regardless of the position of the tail gate.

Additional head room may be provided by mounting extension panels on the wall panels at the sides and front of the superstructure, and providing a higher rear door panel to mount in the fashion just described, as illustrated in FIG. 9. Each extension panel comprises a plywood or fiberboard panel section 80 provided with downwardly open hooks 81 adjacent their lower edges on their inner surfaces for engagement over the upper edges of the side or front end panel as the case may be. The upper edges of the front extension panel would be suitably notched for passage of the members 65. The angle bars 60 in such case would be slid partially out of the stake 20 and re-clamped by bolt 68 in their upwardly adjusted positions.

From the foregoing it can be seen that the roof assembly 30 may be mounted or dismounted by operation of the four screws holding the members 65 to the end boards, or the four bolts 62 holding the members 65 to the angle bars 60, whichever may be more convenient. All of the hardware attached to the wall and door panel and to the roof structure occupies very little space and permits storage of the various sections in a relatively small space.

Having illustrated and described a preferred embodiment of the present invention it may be readily seen that the same permits of a modification in arrangement and detail. I claim as my invention all such modifications as come within the scope of the following claim.

I claim:

In a superstructure for a pickup truck having a bed and sidewalls provided with stake wells,
    stake means having lower end portions designed to fit into the stake wells,
    a plurality of tubular bars, means securing the bars to the upper ends of the posts,
a roof supported by the posts,
a pair of rigid side panel members,
a plurality of hooks secured to the upper ends of the side panel members for engaging the bars to suspend the side panel members from the bars and detachable from the bars by upward edgewise movement of the panel members,
the roof and the bars having sufficient clearance therebetween to permit the side panel members to be slid between the bars and the roof to positions under the roof,
and means for supporting the side panel members in substantially horizontal positions when the side panel members have been slid under the roof.

References Cited in the file of this patent

UNITED STATES PATENTS

| | | |
|---|---|---|
| 1,762,618 | Dymock | June 10, 1930 |
| 2,011,599 | Twiss | Aug. 20, 1935 |
| 2,463,646 | Schassberger | Mar. 8, 1949 |
| 2,486,734 | Campbell | Nov. 1, 1949 |
| 2,711,343 | Falk et al. | June 21, 1955 |
| 2,731,292 | Cole | Jan. 17, 1956 |
| 2,800,358 | Sherrick | July 23, 1957 |
| 3,009,212 | Makens | Nov. 21, 1961 |

FOREIGN PATENTS

| | | |
|---|---|---|
| 715,935 | France | Oct. 5, 1931 |